March 25, 1952  F. A. RYDER ET AL  2,590,275
FLUID METER
Filed March 24, 1945  2 SHEETS—SHEET 1
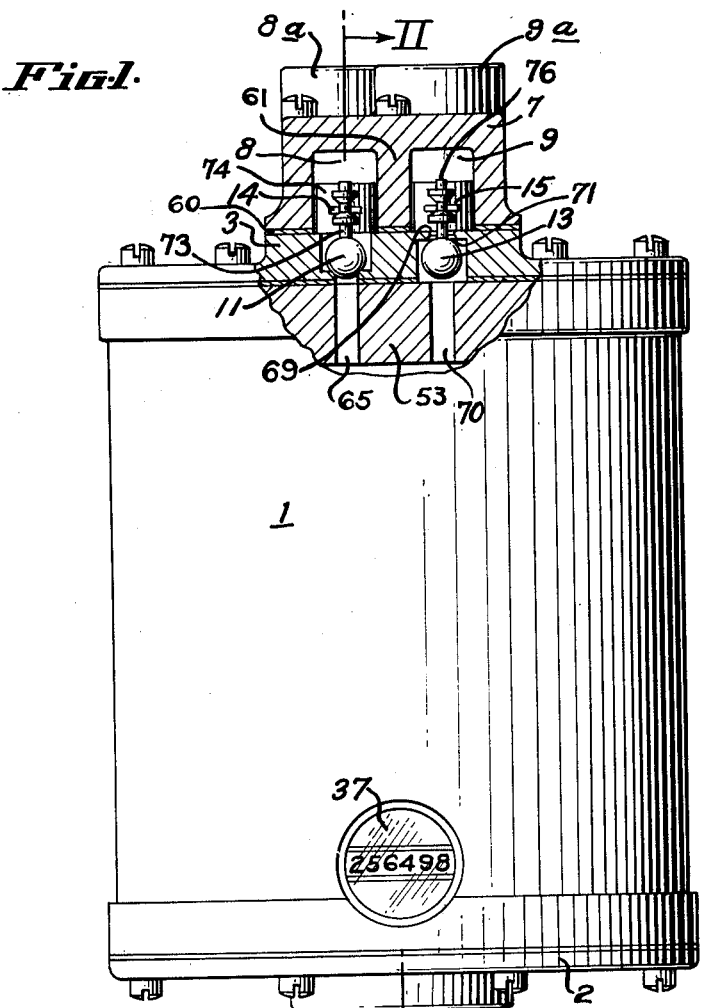
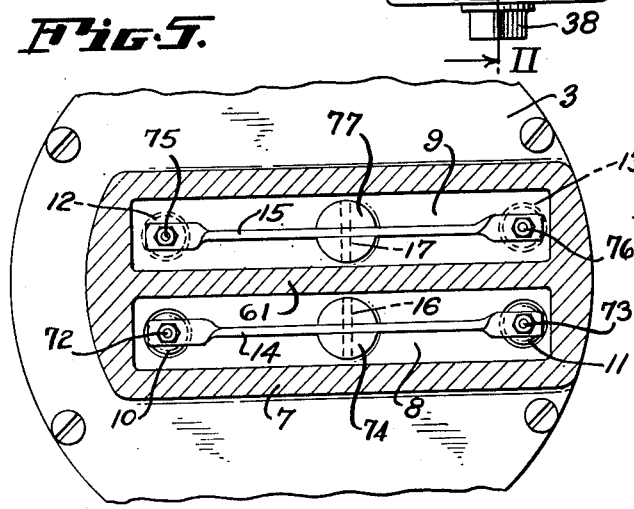
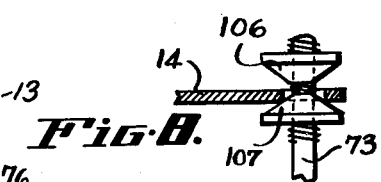
INVENTORS.
FRANK A. RYDER
MILTON H. WEEKS, DECEASED
FERN WEEKS, ADMINISTRATRIX
BY Alfred R. Fuchs
ATTORNEY

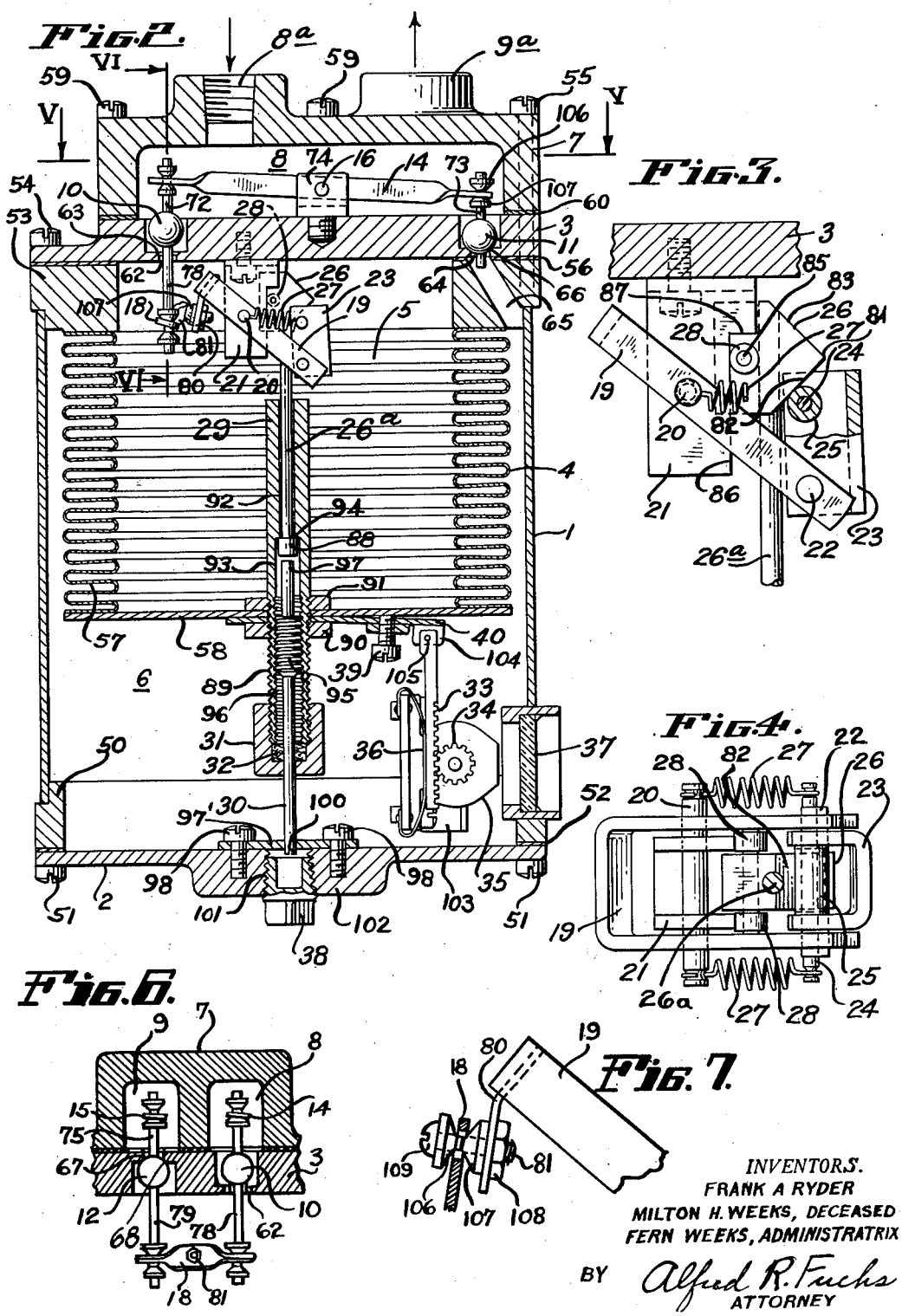

Patented Mar. 25, 1952

2,590,275

UNITED STATES PATENT OFFICE 2,590,275

FLUID METER

Frank A. Ryder, Chicago, Ill., and Milton H. Weeks, deceased, late of Oakland, Calif., by Fern Weeks, administratrix, Oakland, Calif.

Application March 24, 1945, Serial No. 584,670

8 Claims. (Cl. 73—270)

This invention relates to fluid meters, and more particularly to a fluid meter that will operate to accurately meter and register the flow of a fluid under relatively low pressures.

It is a purpose of this invention to provide a fluid meter for accurately metering and indicating the flow of fluid which is operated by the flow of the fluid that is metered, in which an unusually small amount of energy is required to sustain accurate operation thereof.

It is a further purpose of the invention to provide a fluid meter of the above mentioned character that has relatively few working parts, all of which are sealed and immersed in the fluid being metered and in which there is little friction between the working parts.

It is still a further purpose of the invention to provide a fluid meter of the above mentioned character, in which the accuracy in the manufacture and assembly of the working parts is not essential to perfect operation.

More particularly the invention comprises a housing within which is mounted a bellows-like member forming a chamber, the housing being fluidtight and the bellows chamber being fluidtight, to thus provide a pair of fluidtight chambers one within the other, said bellows-like metering chamber being of a character that as the capacity thereof varies the same will vary in length, and said bellows-like member being operatively connected with a registering device so that said registering device will be actuated in accordance with the change in length of the bellows-like member during the operation thereof.

It is a further purpose of the invention to provide valve means for controlling the flow of fluid to and from the bellows and to and from the chamber surrounding the bellows. In the operation of the device during one half of a cycle of operations thereof the flow of the fluid is into the bellows until a definite predetermined volume has been displaced, causing a predetermined increase in size of the bellows chamber by a proportionate lengthening of the bellows, whereupon the valve means moves to an alternate position, and during the second half of the cycle of operations of the device the flow of fluid is into the chamber surrounding the bellows, causing contraction thereof. A counter is connected with the bellows in such a manner that the strokes of the bellows actuate said counter in proportion to the length of said stroke.

It is a further purpose of the invention to provide new and improved means for metering a fluid, comprising a valve mechanism for controlling flow of liquid to and from the chamber within the bellows so that a predetermined change in capacity of the bellows will take place for each stroke thereof, and to provide means for adjusting the stroke of the bellows to obtain the exact change in capacity thereof for each stroke of the same that is desired.

It is an important purpose of the invention to provide means for quickly changing the position of a member that controls operation of the valve means, comprising a snap action mechanism. In the form of the invention shown, said snap action means comprises a cam member moved by means of the bellows and means cooperating therewith for cocking a spring so as to suddenly move the controlling member from one alternative position thereof to the other alternative position thereof, and vice versa.

Other objects and advantages of the invention will appear as the description of the drawings proceeds. It is to be understood, however, that it is not intended to limit the invention to the particular details shown or described, except as defined in the claims.

In the drawings:

Fig. 1 is a view in vertical elevation of the invention, partly broken away to show certain parts thereof in vertical section.

Fig. 2 is a vertical sectional view, certain parts being shown in elevation, said section being taken substantially on the line II—II of Fig. 1.

Fig. 3 is a fragmentary detail view on an enlarged scale of the valve actuating mechanism partly in section and partly in elevation.

Fig. 4 is a bottom plan view of the valve operating mechanism, the operating rod being shown in section.

Fig. 5 is a section taken on the line V—V of Fig. 2.

Fig. 6 is a fragmentary sectional view taken substantially on the line VI—VI of Fig. 2, certain parts being shown in elevation.

Fig. 7 is a fragmentary detail view of a portion of the valve operating means, and Fig. 8 is a fragmentary longitudinal sectional view through the end portion of one of the rocker levers, showing the connection between the same and the valve rods.

Referring in detail to the drawings, the fluid metering device comprises a vertical hollow cylindrical side wall portion 1 closed at opposite ends thereof by means of the heads 2 and 3. Preferably, a ring-like member 50 is secured to the cylindrical member 1 at one end thereof in liquidtight relation, and the hear 2 is secured to said ring-like member by means of screw-threaded headed securing elements 51, suitable gasket members 52 being provided between said ring-like member and the head 2. An annular member 53 is secured in liquidtight relation to the cylindrical member 1 at the other end thereof, and the head 3 is secured thereto in liquidtight relation by the headed screw-threaded securing elements 54 and 55, a gasket 56 being provided between the members 3 and 53 to make a liquidtight joint therebetween.

Mounted within the chamber thus provided within the housing is a bellows 4, which has a flexible side wall portion 57, preferably, made of metal, secured to a rigid end wall 58 at one end thereof in liquidtight relation, and to the ring-like member 53 at the other end thereof in liquidtight relation. The bellows thus provides a dividing means or partition dividing the housing into a chamber 5 within the bellows, and a chamber 6 externally of the bellows. Mounted on the head 3 and secured thereto in liquidtight relation by means of the headed securing elements 55 and 59, is a valve casing 7, suitable gasket means 60 being provided between the valve casing 7 and the head 3. The valve casing 7 is provided with a partition 61 dividing the same into two valve chambers 8 and 9.

Each of the valve chambers 8 and 9 is provided with two ports communicating one with the chamber 5 within the bellows and the other with the chamber 6 externally of the bellows. The port 62 leading into the chamber 5 from the valve chamber 8 is closed by means of the valve 10 engaging the seat 63. The port 64 leading through the passage 65 in the annular member 53 into the chamber 6 is closed by means of the valve 11 engaging the seat 66. The port 67 leads from the chamber 9 to the chamber 5 and flow therethrough is controlled by means of the valve 12 cooperating with the valve seat 68, and the port 69 leads through the passage 70 in the annular member 53 to the chamber 6 exteriorly of the bellows, flow through the port 69 being controlled by means of the valve 13 cooperating with the seat 71.

The valves 10 and 11 are mounted on rods 72 and 73, which are connected with the rocker lever 14 so as to move in unison therewith, said lever having openings loosely receiving said rods. The lever 14 is pivotally mounted on a pin 16, which is carried by the head 74 of a member screw-threadedly engaging in an opening in the head 3 and slotted to accommodate the member 14. The valves 12 and 13 are mounted on rods 75 and 76, which are connected with the rocker lever 15 so as to move in unison therewith, said lever having openings loosely receiving said rods. Said rocker lever 15 is pivotally mounted at its mid-point on a pivot pin 17 mounted in the head 77 of a headed screw-threaded member, screw-threadedly engaging in a screw-theaded opening in the head 3.

The rocker levers are provided in order to control the position of the valves 11 and 13 upon actuation of the valves 10 and 12. Thus, if the valve 10 is unseated, as shown in Fig. 2, the valve 11 will be seated and flow from the chamber 8 to the bellows chamber 5 will be established, and the chamber 6 surrounding the bellows will be shut off from the chamber 8. It will be noted upon reference to Figs. 1 and 6 that the valve members 12 and 13 seat in the opposite direction to the valves 10 and 11, that is, the valves 10 and 11 seat by a downward movement thereof, while the valves 12 and 13 seat by an upward movement thereof.

Downwardly extending stems 78 and 79 are provided on the valves 10 and 12, respectively, these being connected with each other by means of the cross bar 18 so that said valve rods, or stems, 78 and 79 will move up and down with the movement of the cross bar 18.

The position of the cross bar 18 is determined by valve controlling mechanism comprising a U-shaped yoke-like lever member 19, a bracket 80 being welded to the transverse portion of said yoke-like member 19 and being in turn connected with a headed screw-threaded member 81 mounted on said cross bar 18. Said member 81 extends loosely through an opening in the member 18 and is fixed to the member 80. The yoke 19 is pivotally mounted on a pivot pin 20 mounted on a bracket 21 depending from and secured to the head 3. A pin 22 is mounted between the arms of the U-shaped yoke-like member 19 and has pivotally mounted thereon a channel shaped member 23, between the legs of which a pin 24 extends, upon which a roller 25 is mounted for rotation. Said channel-shaped member 23 thus constitutes a link that connects the yoke 19 with the roller 25.

A cam 26 is fixed to a vertical stem 26a and has the inclined cam faces 82 and 83, with which a roller 25 is adapted to engage, said roller riding on these inclined faces due to the action of the springs 27, which are connected at opposite ends thereof with the ends of the pivot pins 20 and 24, said springs being tensioned as the roller rides toward the apex 84 of the cam, either along the face 82 or the face 83 thereof. A pivot pin 85 is provided on the cam member 26, which carries the rollers 28 at opposite ends thereof, said rollers bearing against the vertical edges 86 of the bracket 21, said bracket having an offset therein to provide a shoulder at 87 limiting movement of the rollers 28 in an upward direction.

The stem 26a has a head 88 at the lower end thereof and reciprocates in a tubular member 29, which has a threaded portion 89 and is fixed in position on the rigid end wall 58 in fluidtight relation thereto by means of the nuts 90 and 91. Said tubular member 29 has a small bore 92 in the upper portion thereof and a larger bore 93 in the lower portion thereof defining a shoulder 94, which the head 88 operating in the bore 93 is adapted to engage. Accordingly, when the bellows is extended moving the tubular member 29 downwardly, the head 88 will engage the shoulder 94, pulling the stem 26a and the cam 26 downwardly with the end wall 58 of the bellows.

A calibrating rod 30 for adjusting the stroke of the bellows, and which also serves to guide the bellows and to push the stem 26a upwardly on the return stroke of the bellows 4, is provided with a screw-threaded enlargement 95 thereon, which engages with the internal thread 96 provided in the lower end of the bore 93, a packing nut 31 and packing 32 being provided to seal the joint around the rod 30 so that no liquid can pass from the chamber 6 to the chamber 5, or vice versa, through the tubular member 29. This packed joint does not cause any friction during the operation of the device, because the rod 30 does not move therethrough during the operation of the meter, but only moves when its position is adjusted so as to adjust the spacing of the upper end 97 thereof from the head 88. The rod 30 is slidably mounted in an opening in a plate 97' secured by means of the headed screw-threaded elements 98 to the head 2 of the housing to guide the movements of the bellows. A slot 100 to receive a screwdriver for adjusting the calibrating rod 30 lengthwise of the tubular member 29 is provided, access to which is had by removal of the plug 38 from the screw-threaded opening 101 in the boss 102 provided in the head 2.

A rack 33 is pivotally connected with the end wall 58 of the bellows 4, and engages with a pinion 34 which is mounted on the shaft of a counting mechanism 35. The rack 33 is yieldingly held in mesh with the pinion 34 by means of a spring 36 engaging the rear side of said rack, said spring being mounted on a bracket 103 provided on the inner face of the ring 50. The counter, which is of any suitable character and of a conventional construction, has a dial thereon which may be viewed from the outside of the housing through a liquidtight window 37 mounted in the housing wall.

The pivotal connection between the rack 33 and the end wall 58 of the bellows is, preferably, not a direct one, but is made by means of a resilient member 40 having an ear 104 thereon to which the rack 33 is pivoted, said resilient member 40 having an opening through which the threaded portion of the tubular member 29 extends, and being clamped between the nut 90 and the end wall 58. An adjusting screw 39 is provided on the member 40 engaging the end wall 58, whereby the position of the member 40 and thus the position of the pivot 105 connecting the rack 33 with the end wall through the member 40 can be adjusted.

Referring to Fig. 7, it will be noted that the member 81 is a screw-threaded member having the conical nuts 106 and 107 screw-threadedly mounted thereon, the nut 106 engaging with the head 109 and the nut 107 engaging the bracket 80, the member 80 being clamped between the nut 108 and the conical nut 107. The nuts 106 and 107 are so spaced that sufficient freedom of movement of the cross bar 18 relative to the member 81 to prevent binding is provided. It will be noted upon reference to Figs. 2 and 8 that the conical nuts 106 and 107 on the rod-like members carrying the valves are also so spaced that there is sufficient freedom of movement of the parts to prevent any binding between the valve levers and the valve rods.

The operation of the meter constituting this invention will now be described. The fluid to be metered enters the chamber 8 through the inlet port 8a, the chamber 8 thus constituting an inlet chamber. The metered fluid flows out through the outlet chamber 9 through a port 9a, which is the outlet port of the meter. There will be a difference in pressure of the fluid between the inlet chamber 8 and the outlet chamber 9 as the fluid entering the inlet chamber will be under a slight pressure, which will drop as the fluid passes through the meter. The valves being in the position shown in Figs. 1, 2 and 6 of the drawings, fluid passes from the inlet chamber 8 through the port controlled by the open valve 10 into the chamber 5 within the bellows. The valve 11 will at this time prevent communication between the chamber externally of the bellows and the inlet chamber 8. The valve 13 will, however, be in open position at this time, establishing communication between the chamber 6 and the outlet chamber 9. The fluid admitted to the chamber 5 will extend the bellows 4 displacing the same amount of fluid in the outer chamber 6 as enters the chamber 5, the fluid displaced in the outer chamber passing into the outlet chamber 9 and out of the meter through the outlet port 9a.

The extension of the bellows 4 moves the tube 29 fixed thereto downwardly, the shoulder 94 engaging the enlargement 88 on the stem 26a, moving the stem 26a and cam 26 downwardly. As this downward movement of the cam 26 takes place the roller 25 travels along the inclined face 82 thereof, swinging the link 23 to the right on the pivot 22 tensioning the springs 27 and storing energy therein. This movement continues until the roller 25 passes the apex 84 of the cam, whereupon the springs 27 pull the roller and the pin 24 to the left as viewed in Fig. 3, and the roller 25 rides rapidly along the face 83 of the cam 26 quickly rocking or tilting the lever 19 about the pivot 20 from the position shown in Fig. 3 to a position in which the left hand end thereof as viewed in Fig. 3 is below the pivot 20. The rocking movement imparted to the yoke-like lever 19 pulls the cross bar 18 downwardly, which pulls the valve rods or stems 78 and 79 downwardly, rapidly closing the valves 10 and 13 and simultaneously opening the valves 11 and 12.

This results in the fluid entering the inlet chamber 8, being admitted, due to the valve 11 being open, to the chamber 6 externally of the bellows 4 and causing contraction of the length of the bellows. The valve 12 being now open, the fluid that must pass from the bellows due to the contraction thereof, because of the difference in pressure in the two chambers 6 and 5, connected, respectively, with the chambers 8 and 9, will pass into the outlet chamber and out through the outlet port 9a. As the bellows shortens, or contracts, the space between the head 88 and the end 97 of the calibrating rod 30 decreases until engagement of the end 97 of the rod 30 with the head 88 occurs. The rod 30 then pushes the stem 26a upward as said rod is moving with the end wall 58 of the bellows. The roller 25 then travels down the inclined face 83 and outwardly toward the apex 84 thereof, again tensioning the springs 27 and swinging the link 23 to the right of the position shown in Fig. 3, and when the apex 84 of said cam is reached, the springs will again rock or swing the yoke-like lever 19 to the position shown in Fig. 3, quickly moving the member 18 back to the position shown in the drawings and the valves back to the position shown in the drawings, completing one cycle of operations of the device.

As the end wall 58 of the bellows moves downwardly the rack 33 turns the pinion 34 and advances the counter 35 a distance depending upon the volume of fluid displaced in one complete cycle of the bellows. Thus if the bellows cycle displaces .02 gallon of fluid the down stroke would advance the counter two digits and the counter is to be read in hundredths of gallons. When the end wall 58 of the bellows moves upwardly the counter does not advance because of the usual ratchet mechanism incorporated in the counter, this being conventional construction and not being illustrated in the drawings. Adjustment of the rod 30 will vary the stroke of the bellows 4, thus allowing accurate calibration of the device.

What we claim is:

1. A fluid measuring device, comprising a housing, a bellows mounted therein so as to divide said housing into a chamber within and a chamber externally of said bellows, a fluid inlet, a fluid outlet, valve means having alternate positions, said valve means in one position connecting said inlet with the chamber within said bellows and said outlet with the chamber externally of said bellows and in the other position connecting said inlet with the chamber externally of said bellows and the outlet with the chamber within said bellows, a counter within said housing, means connecting said bellows with said counter to actuate said counter by movement of said bellows, comprising a positive driving connection between said counter and said bellows including a member mounted on said bellows and adjustable relative thereto and a member pivoted on said adjustable member and engaging said counter to drive the same, and means for alternating the position of said valve means, comprising a member actuated by said bellows, snap action mechanism connected with said last mentioned member, and valve operating members connecting said snap action mechanism with said valve means.

2. A fluid measuring device, comprising a housing, a longitudinally extensible and contractible metallic bellows mounted therein so as to divide said housing into a chamber within and a chamber externally of said bellows, a fluid inlet, a fluid outlet, valve means having alternate positions, said valve means in one position connecting said inlet with the chamber within said bellows and said outlet with the chamber externally of said bellows and in the other position connecting said inlet with the chamber externally of said bellows and the outlet with the chamber within said bellows, a counter within said housing, an end wall on said bellows movable longitudinally of said bellows upon extension and contraction thereof, means within said housing connecting said end wall with said counter to actuate said counter a predetermined amount for each stroke of said bellows of predetermined length, comprising a member mounted on and adjustable relative to said end wall and a member pivoted on a fixed pivot on said adjustable member having a positive driving connection with said counter, and means for alternating the position of said valve means, comprising a member actuated by said bellows, snap action mechanism connected with said last mentioned member, and valve operating members connecting said snap action mechanism with said valve means.

3. In a device of the character described, a reciprocable actuating member mounted for rectilinear movement between alternative positions, and means for moving said member from either of said positions to the other thereof by snap action comprising a second reciprocable member, means for reciprocating the same, a cam mounted on said second reciprocable member to move therewith, a lever swingable about a fixed pivotal axis from one alternative position to another connected with said actuating member to reciprocate the same upon swinging said lever between its alternative positions, a member pivotally mounted on said lever, a roller mounted thereon in spaced relation to the pivotal connection with said lever, and resilient means extending between said fixed axis and the axis of rotation of said roller to hold said roller in engagement with said cam.

4. In a device of the character described, valve actuating mechanism comprising a reciprocable actuating member mounted for rectilinear movement between alternative positions, and means for moving said member from either of said positions to the other thereof by snap action comprising a second reciprocable member, means for reciprocating the same including a bellows, a cam mounted on said second reciprocable member to move therewith, a lever swingable about a fixed pivotal axis from one alternative position to another connected with said actuating member to reciprocate the same upon swinging said lever between its alternative positions, a member pivotally mounted on said lever, a roller mounted thereon in spaced relation to the pivotal connection with said lever, and resilient means extending between said fixed axis and the axis of rotation of said roller to hold said roller in engagement with said cam.

5. In a device of the character described, valve actuating mechanism comprising a rectilinearly reciprocable actuating member having alternative positions, and means for moving said member from either of said positions to the other thereof by snap action comprising a second reciprocable member, means for reciprocating the same including a bellows, cooperating means on said bellows and said second reciprocable member providing a predetermined movement of said bellows in either direction before said bellows moves said second reciprocable member, a cam mounted on said second reciprocable member to move therewith, a lever swingable about a fixed pivotal axis from one alternative position to another connected with said actuating member to rectilinearly reciprocate the same upon swinging said lever between its alternative positions, a member pivotally mounted on said lever, a roller mounted thereon in spaced relation to the pivotal connection with said lever, and resilient means extending between said fixed axis and the axis of rotation of said roller to hold said roller in engagement with said cam.

6. In a device of the character described, valve actuating mechanism comprising a longitudinally reciprocable actuating member having alternative positions, and means for moving said member from either of said positions to the other thereof by snap action comprising a second reciprocable member, means for reciprocating the same including a bellows, cooperating means on said bellows and said second reciprocable member providing a predetermined movement of said bellows in either direction before said bellows moves said second reciprocable member, said means being adjustable to vary the amplitude of said predetermined movement, a cam mounted on said second reciprocable member to move therewith, a lever swingable about a fixed pivotal axis from one alternative position to another and movably connected with said actuating member, to reciprocate the same lengthwise of itself upon swinging said lever between its alternative positions, a member pivotally mounted on said lever, a roller mounted thereon in spaced relation to the pivotal connection with said lever, and resilient means extending between said fixed axis and the axis of rotation of said roller to hold said roller in engagement with said cam.

7. In a device of the character described, a reciprocable actuating member having alternative positions, and means for moving said member from either of said positions to the other thereof by snap action comprising a second reciprocable member, means for reciprocating the same, a lost motion connection between said second reciprocable member and said reciprocating means, a cam mounted on said second reciprocable member to move therewith, a lever swingable about a fixed pivotal axis from one alternative position to another connected with said actuating member to reciprocate the same upon swinging said lever between its alternative positions, a member pivotally mounted on said lever, a roller mounted thereon in spaced relation to the pivotal connection with said lever, and resilient means extending between said fixed axis and the axis of rotation of said roller to hold said roller in engagement with said cam.

8. In a fluid measuring device having a housing, a longitudinally extensible and contractible metallic bellows in said housing dividing the same into a chamber within and a chamber externally of said bellows, and valve means controlling flow of fluid into and out of said chambers, a pair of reciprocable valve operating members movable lengthwise of themselves to alternative positions to move all said valves simultaneously, and snap action means for moving said member actuated by a predetermined movement of said bellows, comprising a tiltable member loosely pivotally connected with said valve operating members to reciprocate the same, means for tilting said member from one limiting position to another and vice versa, including a longitudinally reciprocable member, cam means mounted on said reciprocable member, means mounted for movement with said bellows and having a lost motion connection with said last mentioned reciprocable member for moving said last mentioned reciprocable member a stroke by either predetermined extension or contraction of said bellows, a cam follower pivoted on said tiltable member and resilient means connected with said follower and housing to be successively cocked and released to suddenly tilt said member from one position to another.

FRANK A. RYDER.
FERN WEEKS,
*Administratrix of the Estate of Milton H. Weeks, Deceased.*

REFERENCES CITED

The following references are of record in the file of this patent:

UNITED STATES PATENTS

| Number | Name | Date |
|---|---|---|
| 120,853 | Campeaux | Nov. 14, 1871 |
| 126,981 | Olney | May 21, 1872 |
| 132,497 | Spooner | Oct. 22, 1872 |
| 274,848 | Thomson | Mar. 27, 1883 |
| 398,721 | Harrell | Feb. 26, 1889 |
| 572,414 | Dixon | Dec. 1, 1896 |
| 1,264,529 | Kocourek | Apr. 30, 1918 |
| 1,417,998 | Johanson | May 30, 1922 |
| 1,421,138 | Anderson | June 27, 1922 |
| 1,768,625 | Olsen | July 1, 1930 |
| 2,089,186 | De Lancey et al. | Aug. 10, 1937 |
| 2,242,659 | Reid | May 20, 1941 |
| 2,367,543 | Udale | Jan. 16, 1945 |

FOREIGN PATENTS

| Number | Country | Date |
|---|---|---|
| 77,288 | Germany | Oct. 6, 1894 |
| 16,070 | Great Britain | 1897 |